United States Patent
Boland

(10) Patent No.: US 9,862,355 B2
(45) Date of Patent: Jan. 9, 2018

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1402 days.

(21) Appl. No.: 12/666,901

(22) PCT Filed: Jun. 17, 2008

(86) PCT No.: PCT/EP2008/057634
§ 371 (c)(1),
(2), (4) Date: Jun. 14, 2010

(87) PCT Pub. No.: WO2009/000706
PCT Pub. Date: Dec. 31, 2008

(65) Prior Publication Data
US 2010/0299862 A1    Dec. 2, 2010

(30) Foreign Application Priority Data

Jun. 26, 2007  (EP) .................................. 07111052

(51) Int. Cl.
| | |
|---|---|
| *A47L 1/00* | (2006.01) |
| *B60S 1/02* | (2006.01) |
| *B60S 1/38* | (2006.01) |

(52) U.S. Cl.
CPC ................ *B60S 1/38* (2013.01); *B60S 1/381* (2013.01); *B60S 1/3855* (2013.01);
(Continued)

(58) Field of Classification Search
CPC .......... B60S 1/38; B60S 1/381; B60S 1/3855; B60S 1/3881; B60S 2001/382; B60S 2001/3822; B60S 1/3851
(Continued)

(56) References Cited

U.S. PATENT DOCUMENTS 7,861,363 B2 *  1/2011  Moll et al. ............... 15/250.201
2002/0148064 A1 * 10/2002  Dietrich et al. ........... 15/250.43
(Continued)

FOREIGN PATENT DOCUMENTS

| | | |
|---|---|---|
| DE | 101 14 476 A1 | 9/2002 |
| FR | 2871127 A | 12/2005 |

(Continued)

OTHER PUBLICATIONS

Definition of Polymers by the Society of Plastics Engineers found at: http://www.4spe.org/plastics-encyclopedia/polymers-resins.*
Engligh translation of WO 2006/117081 by European Patent Office on Espacenet.*
(Continued)

*Primary Examiner* — Brian D Mattei
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein the oscillating arm is pivotally connected to the connecting device about a pivot axis near one end, with the special feature that the longitudinal groove has a closed circumference, wherein the connecting device is connected to the wiper blade.

15 Claims, 4 Drawing Sheets

(52) U.S. Cl.
CPC ....... *B60S 1/3881* (2013.01); *B60S 2001/382* (2013.01); *B60S 2001/3822* (2013.01)

(58) Field of Classification Search
USPC ............... 15/250.43, 250.201, 250.361, 15/250.451–250.454
See application file for complete search history.

(56) References Cited

U.S. PATENT DOCUMENTS

| | | | |
|---|---|---|---|
| 2004/0181894 A1* | 9/2004 | Lee et al. | 15/250.201 |
| 2006/0037167 A1* | 2/2006 | Nacamuli | 15/250.201 |
| 2007/0022556 A1* | 2/2007 | Walworth et al. | 15/250.201 |
| 2007/0113366 A1* | 5/2007 | Walworth et al. | 15/250.32 |
| 2007/0174989 A1* | 8/2007 | Moll | B60S 1/38 |
| | | | 15/250.201 |
| 2008/0022478 A1* | 1/2008 | Jarasson | B60S 1/381 |
| | | | 15/250.201 |
| 2010/0275403 A1* | 11/2010 | Jollec | 15/250.361 |

FOREIGN PATENT DOCUMENTS

| | | | | |
|---|---|---|---|---|
| FR | 2 891 227 A | | 3/2007 | |
| WO | WO 02/04269 A | | 1/2002 | |
| WO | WO 2006117081 A1 * | | 11/2006 | B60S 1/38 |

OTHER PUBLICATIONS

English translation of FR 2,891,227 by European Patent Office on Espacenet.*

* cited by examiner

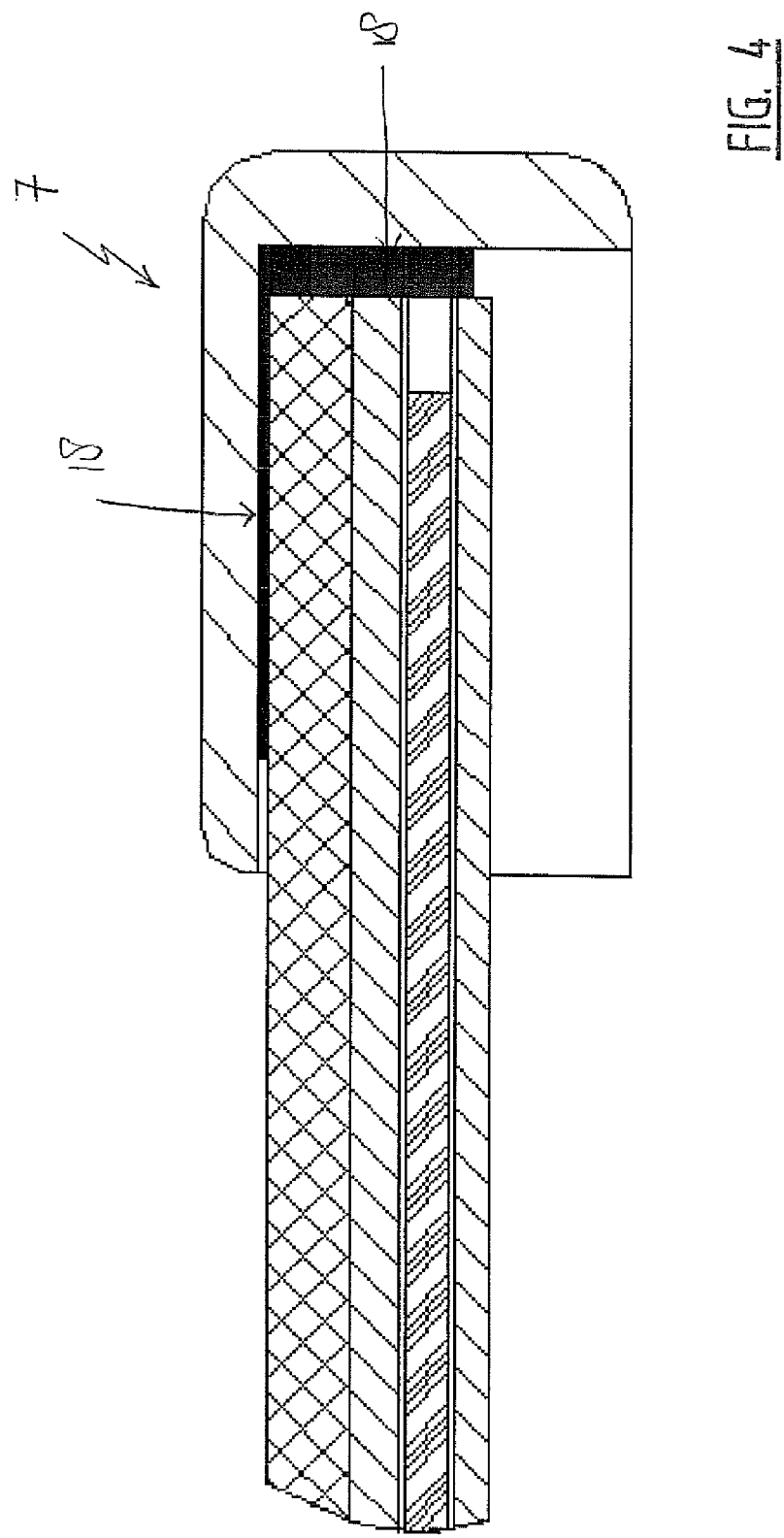

WINDSCREEN WIPER DEVICE

BACKGROUND OF THE INVENTION

1. Technical Field

The present invention relates to a windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, which windscreen wiper device comprises a connecting device for an oscillating arm, wherein the oscillating arm is pivotally connected to the connecting device about a pivot axis near one end.

2. Related Art

Such a windscreen wiper device is known from international (PCT-) patent publication no. WO 02/090155 in the name of the same Applicant. The prior art windscreen wiper device is in particular designed as a "yokeless" wiper device, wherein use is no longer made of several yokes pivotally connected to each other, but wherein the wiper blade is biassed by the carrier element, as a result of which it exhibits a specific curvature. In this known windscreen wiper device the wiper blade includes two opposing longitudinal grooves on its longitudinal sides, in which grooves spaced-apart longitudinal strips of the carrier element are disposed. Neighbouring ends of the longitudinal strips are interconnected by the respective connecting piece. A sometimes felt disadvantage of the windscreen wiper device as described in the above international (PCT-) patent publication is that it is too expensive.

SUMMARY OF THE INVENTION

It is an object of the invention to improve the prior art, that is to improve a windscreen wiper device known from the above international (PCT-) patent publication, wherein a low cost "yokeless" wiper device or "flat blade" is proposed.

In order to accomplish that objective, a windscreen wiper device of the kind referred to in the introduction according to the invention is characterized in that the longitudinal groove has a closed circumference, wherein the connecting device is connected to the wiper blade. Instead of two separate longitudinal strips inserted in two opposing longitudinal grooves in the wiper blade, now use is made of particularly one central groove having a closed circumference, thus forming a central channel for particularly one longitudinal strip. the connecting device is not connected to longitudinal strip (s), as in the prior art, but to the wiper blade made of an elastomer material, such as rubber.

It is noted that the invention is not restricted to use with passenger cars, but it can also be used with trains and other fast vehicles.

In one preferred embodiment of a windscreen wiper device in accordance with the invention the wiper blade comprises an elongated upper holding part and an elongated lower wiping part of a flexible material, wherein the holding part comprises the longitudinal groove and holds the wiping part, and wherein the connecting device is connected to the holding part.

Particularly, the holding part comprises downwardly extending arms, seen in cross-section, for pivotally engaging the wiping part. In other words, a mechanical articulation is realized between the holding part and the wiping part, wherein the holding part holds the wiping part allowing the wiping part to make pivotal or hingeable movements relative to the holding part during use. In use the pivotal movements of the wiping part correspond to oscillatory movements of the oscillating arm. Due to the mechanical articulation the wiping part will not have to bend to follow the oscillatory movements of the oscillating arm, so that a permanent deformation of the wiping part as a result of stress in the rubber thereof is avoided. Please note that a sometimes felt disadvantage of the windscreen wiper device as described in the above international (PCT-) patent publication is that a rubber wiping lip of the wiper blade might show a permanent deformation after several months of use, as the wiping lip has to make many oscillating movements during use, wherein the wiping lip has to bend severely. Bending the rubber of the wiping lip many times back and forth might lead to a permanent deformation of the rubber and thus to deteriorated wiping properties, with all negative consequences involved.

Experiments of the present invention have shown that the wiping part particularly comprises a wiping lip, a neck extending from the wiping lip, as well as an enlarged head extending from the neck, wherein the enlarged head is mounted into a hollow chamber defined by the arms of the holding part. Preferably, the enlarged head has a circular, elliptical, square, rectangular, rhomboid or heart-shaped cross-section. the wiping lip is placed in abutment with a windscreen to be wiped. the wiping lip, the neck and the enlarged head particularly are preferably in one piece and extend in longitudinal direction along the entire length of the wiper blade. In particular, the holding part comprise inwardly extending end parts, wherein the neck is located at least partly between the end parts, and wherein the enlarged head is located above the end parts. In other words, the enlarged head is confined in the hollow chamber, wherein the hook-shaped end parts further retain the wiping part onto the holding part. Particularly, the hollow chamber comprises a lubricant in order to allow smooth pivotal movements of the wiping part without wear. More in particular, the arms of the holding part comprise inwardly extending end parts, wherein the neck is located at least partly between the end parts, and wherein the enlarged head is located above the end parts. In other words, the enlarged head is confined in the hollow chamber, wherein the hook-shaped end parts further retain the wiping part onto the holding part. Particularly, the hollow chamber comprises a lubricant in order to allow smooth pivotal movements of the wiping part without wear.

It is noted that the holding part and the wiping part extend in longitudinal direction along the entire length of the wiper blade. In other words, the wiper blade consists of two mutually cooperating constructional elements, namely the holding part and the wiping part. the parts are preferably slidably connected to each other, wherein the enlarged head of the wiping part is slidably mounted into the hollow chamber of the holding part. The hollow chamber extends along the entire length of the wiper blade so as to form a channel with two open ends. One of the open ends of the channel forms an entrance through which the wiping part as a separate construction element can be slid by hand into the channel until the wiping part is finally retained onto the holding part (the first position). the open end also acts as an exit through which the wiping part can be slid by hand from the first position until the wiping part as a separate "loose" construction element can be replaced or repaired (the second position).

In another preferred embodiment of a windscreen wiper device according to the invention the connecting device is welded, soldered or glued to the wiper blade. In other words, the connecting device and the wiper blade are connected together so as to withstand shearing forces in a direction along the longitudinal strip. In practice, a soldering operation is also called a brazing operation. the connecting device is welded, soldered or glued along its entire length to the wiper blade or at several distinct points along its length. Preferably, the connecting device is welded or soldered to the wiper blade through an ultrasonic welding or soldering operation. More particularly, a polymer material is used as a soldering material, preferably a polymer resin.

In another preferred embodiment of a windscreen wiper device in accordance with the invention outer ends of the longitudinal groove are closed by a respective connecting piece connected to the wiper blade. the connecting pieces or "end caps" serve to block any movement of the longitudinal strip. In a preferred embodiment the connecting pieces or "end caps" are connected to a longitudinal horizontal side of the holding part that faces away from a windscreen to be wiped. In addition thereto or instead thereof the connecting pieces or "end caps" are connected to a vertical end side of the holding part.

It is noted that what has been indicated above regarding welding, soldering or glueing of the connecting device, also applies here to welding, soldering or glueing of the connecting pieces. In other words, the connecting pieces are preferably welded, soldered or glued to the wiper blade, particularly through an ultrasonic welding or soldering operation. More in particular, a polymer material comprising a polymer resin is used therewith as a soldering material.

THE DRAWINGS

The invention will now be explained in more detail with reference to figures illustrated in a drawing, wherein:

FIG. 4 is a cross-section of the windscreen wiper device of FIG. 1 at the location of a connecting piece at both ends of a wiper blade thereof.

DETAILED DESCRIPTION

Figure 1:
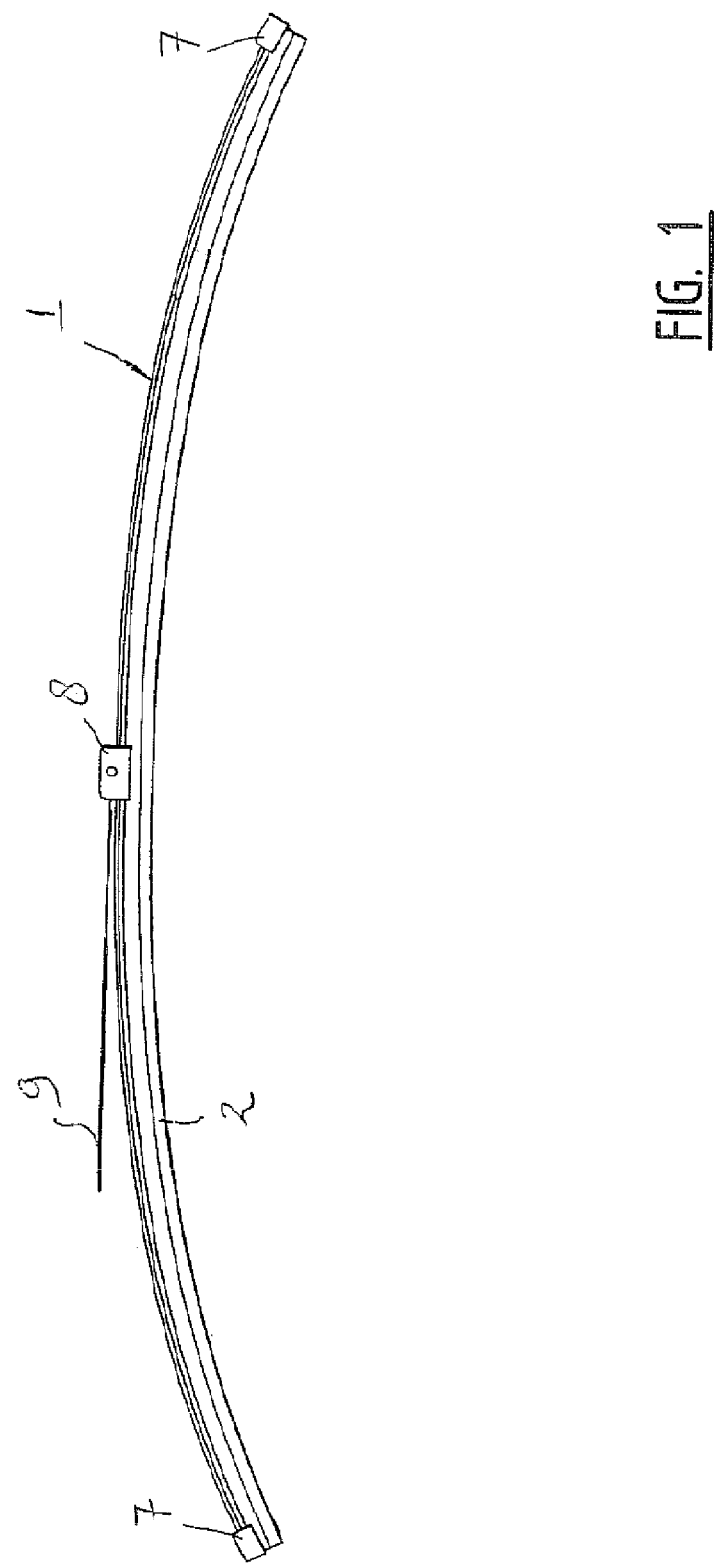
FIG. 1 shows a perspective view of a windscreen wiper device according to a preferred embodiment of the invention.
Figure 2:
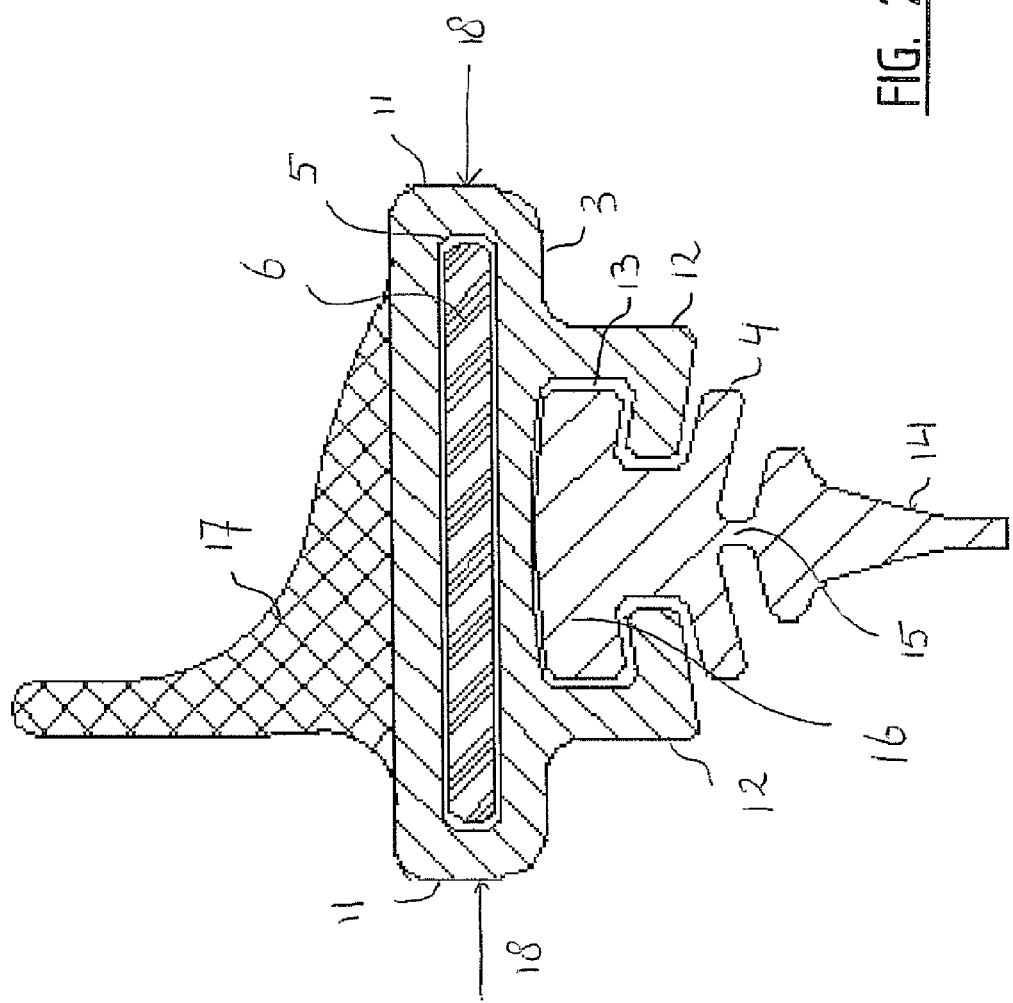
FIGS. 2 and 3 are a cross-section of the windscreen wiper device of FIG. 1 at the location of a connecting device for an oscillating arm and at another location outside the connecting device, respectively.

FIGS. 1 and 2 show a preferred variant of a windscreen wiper device 1 according to the invention. the windscreen wiper device 1 is built up of a wiper blade 2 consisting of a plastic elongated upper holding part 3 and an elastomeric elongated lower wiping part 4, both extending in longitudinal direction along the entire length of the wiper blade 2. In the holding part 3 a central longitudinal groove 5 is formed, in which a longitudinal strip 6 made of spring band steel is fitted (FIG. 2). the strip 6 forms a flexible carrier element for the rubber wiper blade 2, as it were, which is thus biased in a curved position (the curvature in operative position being that of a windscreen to be wiped). Outer ends of the wiper blade 2 are connected on either side of the windscreen wiper device 1 to connecting pieces 7.

The windscreen wiper device 1 is furthermore built up of a connecting device 8 of plastic material for an oscillating wiper arm 9 (FIG. 1). the connecting device 8 comprises clamping members 10 that are integral therewith, which engage round longitudinal sides 11 of the holding part 3 that face away from each other, as a result of which the connecting device 8 is firmly attached to the unit consisting of the holding part 3 and the strip 6. The oscillating wiper arm 9 is pivotally connected to the connecting device 8 about a pivot axis near one end thereof.

Figure 3:
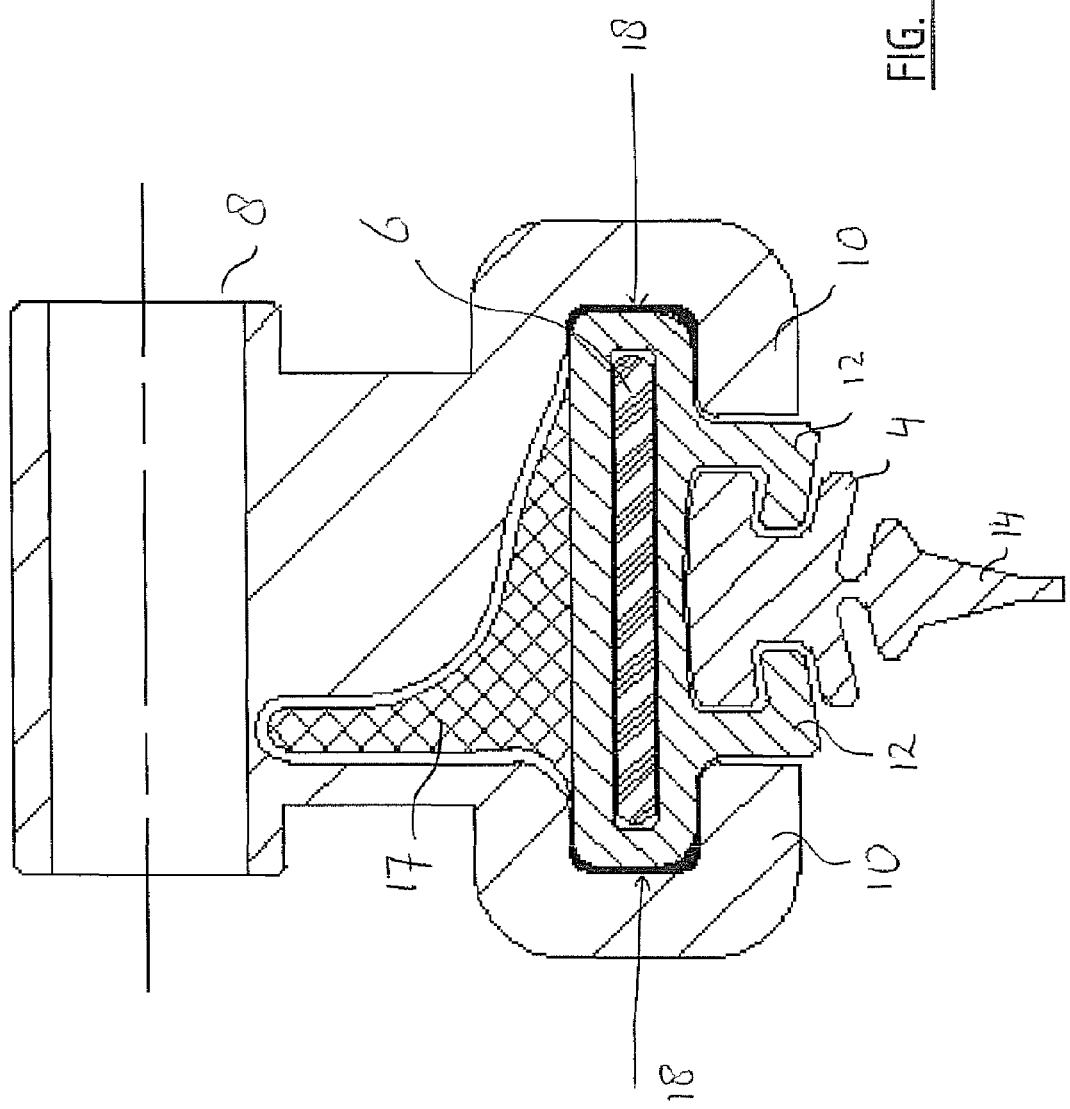

As can be seen from FIGS. 2 and 3, the holding part 3 is provided with downwardly extending arms 12 in one piece therewith, seen in cross-section, thus defining a hollow chamber or space 13, again seen in cross-section. the hollow chamber 13 extends in longitudinal direction along the entire length of the wiper blade 2, so as to form a channel with two open outer ends. Again referring to FIGS. 2 and 3, the wiping part 4 consists of a wiping lip 14, a neck 15 extending from the wiping lip 14, as well as an enlarged head 16 extending from the neck 15 and having a rectangular cross-section. the parts 3,4 are slidably connected to each other, wherein the enlarged head 16 of the wiping part 4 is slidably mounted into the hollow channel of the holding part 3. One of the open ends of the channel forms an entrance through which the wiping part 4 as a separate construction element can be slid by hand into the channel until the wiping part 4 is finally retained onto the holding part 3 (the first or holding position). the open end also acts as an exit through which the wiping part 4 can be slid by hand from the first position until the wiping part 4 as a separate "loose" construction element can be replaced or repaired (the second position). The aims 12 of the holding part 3 pivotally engage the enlarged head 16 of the wiping part 4, so as to allow a pivotal or hingeable movement of the wiping part 4 when the oscillating wiper arm 9 attached to the holding part 3 makes a corresponding oscillatory movement.

A spoiler or air deflector 17 is present either located on a side of the holding part 3 which faces away from the wiping part 4, wherein the spoiler 17 is in one piece with the holding part 3 (FIGS. 2 and 3) or attached as a detachable separate construction element thereto. A lubricant can be present in the channel 13.

the connecting device 8 and the connecting pieces 7 are particularly welded, soldered or glued to the wiper blade 2 at elongated locations indicated with reference numerals 18.

Although not depicted in the figures, it will be clear for a person skilled in the art that the oscillating wiper arm 9 is connected to a mounting head fixed for rotation to a shaft driven by a small motor. In use, the shaft rotates alternately in a clockwise and in a counter-clockwise sense carrying the mounting head into rotation also, which in turn draws the oscillating wiper arm 9 into rotation and by means of the connecting device 8 moves the wiper blade 2.

The invention is not restricted to the embodiments shown, but also extends to other preferred variants falling within the scope of the appended claims. For example, a skilled person would easily understand that the central longitudinal strip 6 of FIGS. 2 and 3 could well be replaced by two longitudinal strips 6 located in correspondingly shaped grooves 5 in the holding part 3.

The invention claimed is:

1. A windscreen wiper device comprising an elastic, elongated carrier element, as well as a two piece elongated wiper blade including an upper holding part and an elongated lower wiping part of a flexible material which can be placed in abutment with a windscreen to be wiped, wherein said upper holding part includes a pair of arms that define a hollow channel which extends in a longitudinal direction, wherein said lower wiping part has an enlarged head that is received in said hollow channel of said upper holding part with a gap at least partially surrounding said enlarged head within said hollow channel such that said lower wiping part can pivot relative to said upper holding part, wherein said upper holding part includes at least one longitudinal groove and includes a spoiler which extends continuously between opposite longitudinal ends of said upper holding part, in said groove a longitudinal strip of the carrier element is disposed, wherein said windscreen wiper device comprises a connecting device configured for attachment with an oscillating arm, said connecting device having clamping members that engage around longitudinal sides of said upper holding part, wherein said longitudinal groove has a closed circumference along its length, wherein said spoiler of said upper holding part extends through a passage in said connecting device, and wherein said clamping members of said connecting device are welded, soldered or glued to only said upper holding part of said wiper blade.

2. A windscreen wiper device according to claim 1, wherein said connecting device is connected to longitudinal vertical sides of said upper holding part that face away from each other.

3. A windscreen wiper device according to claim 1, wherein said connecting device is connected to a longitudinal horizontal side of said upper holding part that faces towards a windscreen to be wiped.

4. A windscreen wiper device according to claim 1, wherein said connecting device is welded or soldered to said wiper blade through an ultrasonic welding or soldering operation.

5. A windscreen wiper device according to claim 1, wherein a polymer material is used as a soldering material.

6. A windscreen wiper device according to claim 5, wherein said polymer material comprises a polymer resin.

7. A windscreen wiper device according to claim 1, wherein outer ends of said longitudinal groove are closed by a respective connecting piece connected to said wiper blade.

8. A windscreen wiper device according to claim 7, wherein said connecting pieces are connected to a longitudinal horizontal side of said upper holding part that faces away from a windscreen to be wiped.

9. A windscreen wiper device according to claim 7, wherein said connecting pieces are connected to a vertical end side of said upper holding part.

10. A windscreen wiper device according to claim 7, wherein said connecting pieces are welded, soldered or glued to said wiper blade.

11. A windscreen wiper device according to claim 10, wherein said connecting pieces are welded or soldered to said wiper blade through an ultrasonic welding or soldering operation.

12. A windscreen wiper device according to claim 10, wherein a polymer material is used as a soldering material.

13. A windscreen wiper device according to claim 12, wherein said polymer material comprises a polymer resin.

14. A windscreen wiper device according to claim 1, wherein said connecting device is of one integrally formed piece of material.

15. A windscreen wiper device according to claim 1, wherein said connecting device includes a lateral bore which is located above said passage for said spoiler.

* * * * *